Figure 1:
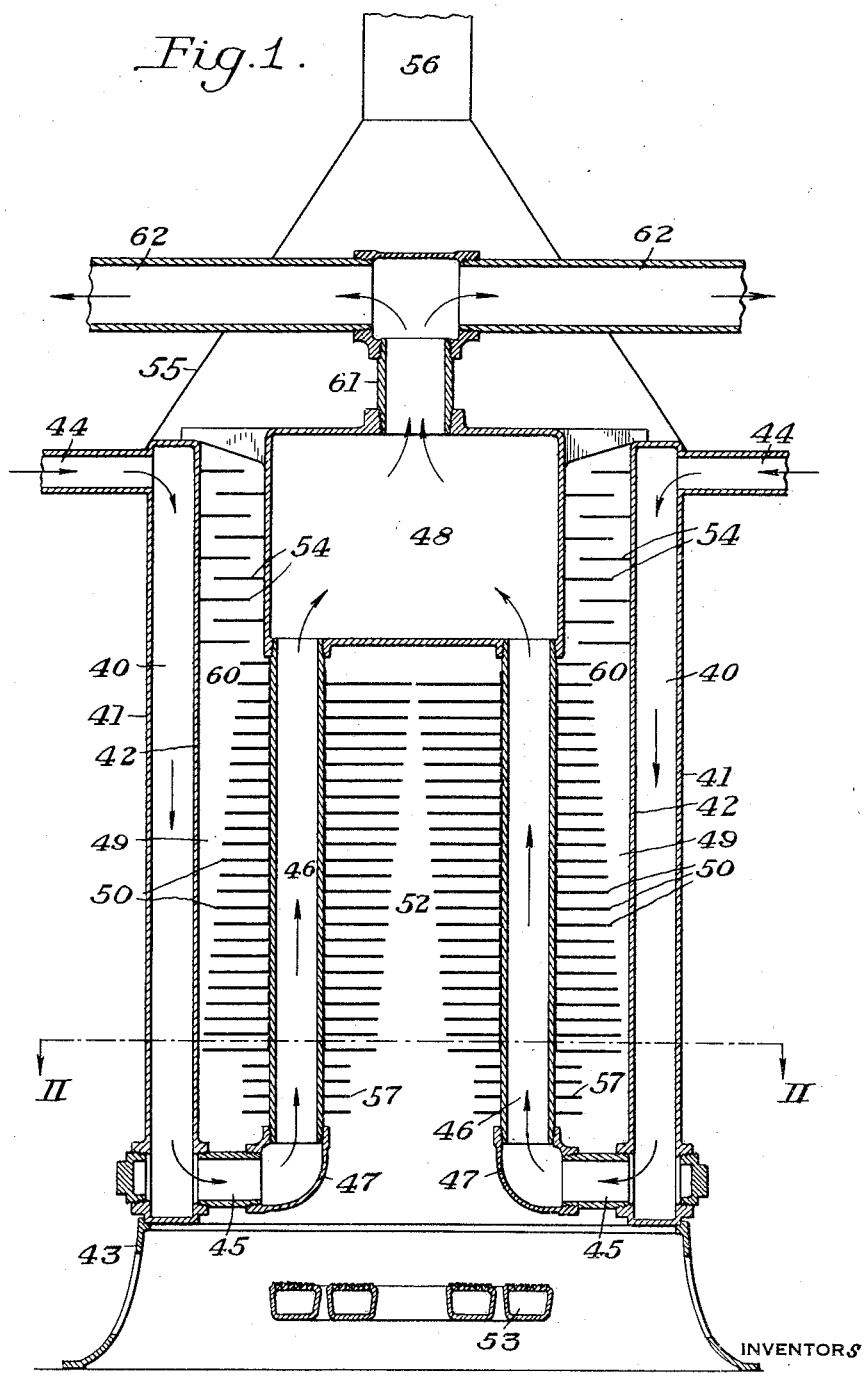

March 29, 1932.  L. LEE ET AL  1,851,851

HEATER

Filed Aug. 7, 1930  2 Sheets-Sheet 1

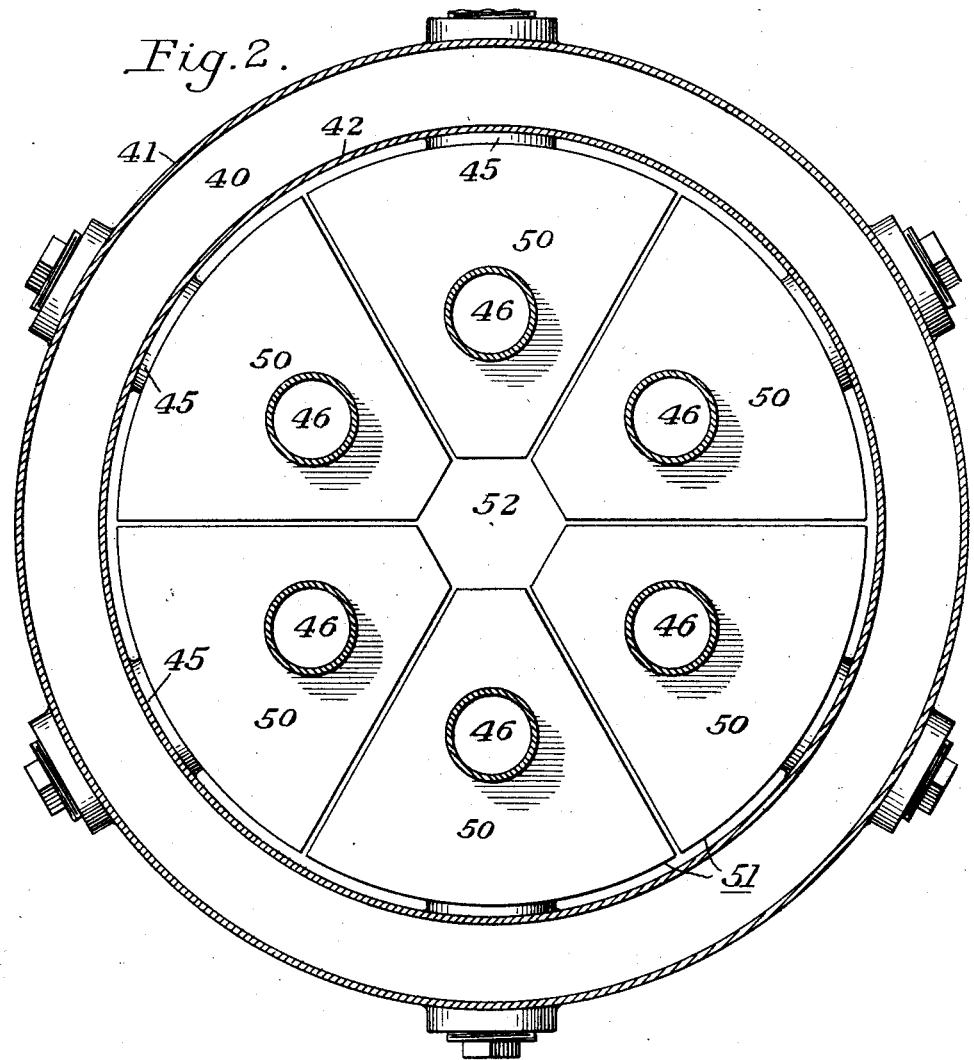

Patented Mar. 29, 1932

1,851,851

UNITED STATES PATENT OFFICE

LEIF LEE AND HUGH H. HAMILTON, OF YOUNGSTOWN, OHIO

HEATER

Application filed August 7, 1930. Serial No. 473,750.

This invention relates generally to heaters for heating water, air or other fluids and is described herein as applied to the heating of water.

In order to increase the radiating surfaces of a heater it has been proposed heretofore to provide the outer surface of the combustion chamber with fins or baffles. In accordance with the present invention the interior surface of the combustion chamber is provided with baffles of good heat conducting material, such as copper, and these baffles conduct the heat from the combustion gases outwardly from the center of the heater to pipes or other conduits in which water flows. A further feature of the present invention is that the water to be heated forms a surrounding insulating layer around the outside of the furnace which prevents or decreases the dissipation of heat. In one form of the invention a partial counter-current flow of the water and combustion gases is employed.

In the accompanying drawings, which illustrate a preferred embodiment of the invention, Figure 1 is a vertical section through the heater, and Figure 2 is a horizontal section on an enlarged scale taken on the line II—II of Figure 1.

Referring more particularly to the drawings, a heater is shown in which an outer annular water chamber 40 is formed by an outer wall 41 and an inner wall 42, the walls of the chamber being supported upon a base 43. Cold water is admitted to the chamber 40 through pipes 44, and the water after having passed through the chamber 40 flows through pipes 45 into vertically extending pipes 46 which are connected at their lower ends to the pipes 45 by couplings 47 and which are connected at their upper ends to a hot water tank 48. The combustion chamber 49 defined by the inner wall 42 is provided with a series of baffles 50 secured to the pipes 46.

In the illustrated embodiment there are six vertically extending pipes 46, and six baffles 50 in each horizontal plane, although the number of pipes and baffles may be varied as desired. Six of these individual baffles 50 form a horizontal partition 51 having an opening 52 at its center. As shown in Fig. 1, the openings 52 are largest at the bottom of the heater and smallest at the top of the heater so as to cause a wedging action of the combustion gases supplied from a burner 53. The wedging of the gases causes them to flow outwardly from the center of the heater around the pipes 46 into contact with the wall 42, and thence upwardly through baffles 54 to a hood 55 and stack 56. Other baffles 57 are secured to the lower ends of the pipes 46. It is preferred to make the lower baffles of a good heat resisting material, such as cast iron, which will withstand the intense heat of the gases from the burners, and to make the remaining baffles out of a good heat conducting material, such as copper, which will readily transmit heat to the water.

The cold water enters the chamber 40 from pipes 44 and after having flowed downwardly through the chamber 40 passes through the pipes 45 into the vertically extending pipes 46 and is then delivered to a storage tank 48. Due to the arrangement of the baffles the combustion gases are wedged and forced outwardly around the pipes 46 and flow upwardly through the chamber 49, then past baffles 54 to the stack. The arrangement of the baffles 50 provides a free space 60 to allow for the passage of the gases to the stack. The hot water is delivered from the hot water tank 48 through pipes 61 and 62.

We have illustrated and described a preferred embodiment of the invention. It is to be understood, however, that the invention may be otherwise embodied within the scope of the following claims.

We claim:

1. A heater comprising an inner combustion chamber and an outer fluid chamber, fluid conduits disposed in the combustion chamber and in communication with the outer fluid chamber, baffles of good heat conducting material in the combustion chamber disposed to force the combustion gases toward the outer fluid chamber and transfer heat to the fluid conduits, a hot water storage tank within the combustion chamber, and means for causing fluid to traverse the outer fluid chamber and then said fluid conduits and be delivered to said hot water storage tank.

2. A heater comprising an inner combustion chamber, a water jacket surrounding the combustion chamber and having a water inlet, a plurality of vertically extending water pipes within the combustion chamber and in communication with the water jacket, baffles of good heat conducting material within the combustion chamber and in contact with said vertical water pipes, the baffles forming a gas passage between the water pipes which decreases in size from the bottom to the top of the heater, whereby the gas is forced outwardly toward the water jacket.

3. A heater comprising an inner combustion chamber, a water jacket surrounding the combustion chamber and having a water inlet, a plurality of vertically extending water pipes within the combustion chamber and in communication with the water jacket, baffles of good heat conducting material within the combustion chamber and in contact with said vertical water pipes, the baffles forming a gas passage between the water pipes which decrease in size from the bottom to the top of the heater, whereby the gas is forced outwardly toward the water jacket, said baffles also providing a gas passage between the vertical pipes and water jacket which increases in size from the bottom toward the top of the heater.

In testimony whereof we have hereunto set our hands.

LEIF LEE.
HUGH H. HAMILTON.